(12) United States Patent
Ahn et al.

(10) Patent No.: US 12,279,313 B2
(45) Date of Patent: Apr. 15, 2025

(54) METHOD AND APPARATUS FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Joonkui Ahn, Seoul (KR); Youngdae Lee, Seoul (KR); Sukhyon Yoon, Seoul (KR); Jaehyung Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 407 days.

(21) Appl. No.: 17/775,761

(22) PCT Filed: Nov. 12, 2020

(86) PCT No.: PCT/KR2020/015891
§ 371 (c)(1),
(2) Date: May 10, 2022

(87) PCT Pub. No.: WO2021/096249
PCT Pub. Date: May 20, 2021

(65) Prior Publication Data
US 2022/0394777 A1 Dec. 8, 2022

(30) Foreign Application Priority Data
Nov. 12, 2019 (KR) .................. 10-2019-0144475

(51) Int. Cl.
*H04W 74/0833* (2024.01)
*H04L 5/00* (2006.01)

(52) U.S. Cl.
CPC ....... *H04W 74/0833* (2013.01); *H04L 5/0055* (2013.01)

(58) Field of Classification Search
CPC .................. H04W 74/0833; H04L 5/0055
See application file for complete search history.

(56) References Cited

U.S. PATENT DOCUMENTS

| 2017/0078830 | A1* | 3/2017 | Wu | H04W 72/51 |
| 2018/0310335 | A1* | 10/2018 | Tang | H04W 72/04 |
| 2022/0312501 | A1* | 9/2022 | Lei | H04W 72/0453 |

FOREIGN PATENT DOCUMENTS

WO WO-2020221861 A1 * 11/2020

OTHER PUBLICATIONS

Intel Corporation, "Discussion on channel structure for 2-step RACH", 3GPP TSG RAN WG1 #98bis, Oct. 14-20, 2019, R1-1910634.
(Continued)

*Primary Examiner* — Joseph E Avellino
*Assistant Examiner* — Maryam Emadi
(74) *Attorney, Agent, or Firm* — BRYAN CAVE LEIGHTON PAISNER LLP

(57) ABSTRACT

The present invention relates to a wireless communication system and, more particularly, to a method and an apparatus therefor, the method comprising the steps of: as a part of a 2-step RA procedure, transmitting MsgA to a base station, wherein the MsgA includes a PRACH and a first PUSCH; on the basis of the first PUSCH being accompanied by SDT and the SDT being a portion of SDT data, additionally transmitting the rest of the SDT data to the base station via one or more second PUSCHs in a state where there is no RRC connection to the base station; and on the basis of the first PUSCH being not accompanied by the SDT, performing a procedure for the RRC connection to the base station.

15 Claims, 10 Drawing Sheets

(56) References Cited

OTHER PUBLICATIONS

OPPO, "On Channel Structure for 2-step RACH", 3GPP TSG RAN WG1 #98bis, Oct. 14-20, 2019, R1-1910987.
Sony, "Remaining issues on Two-Step RACH Channel Structure", 3GPP TSG RAN WG1 Meeting #99, Nov. 18-22, 2019, R1-1912337.
Email Discussion Rapporteur (ZTE), "Procedures and mgsB content [105bis#30[]NR12-step RACH]", 3GPP TSG-WG2 Meeting #106, May 13-17, 2019, R2-1906308.
ZTE Corporation (email discussion moderator), "Summary of small data enhancements for NR Rel-17", 3GPP TSG-RAN Meeting #85, Sep. 16-20, 2019, RP-191840.

* cited by examiner

[FIG. 1]
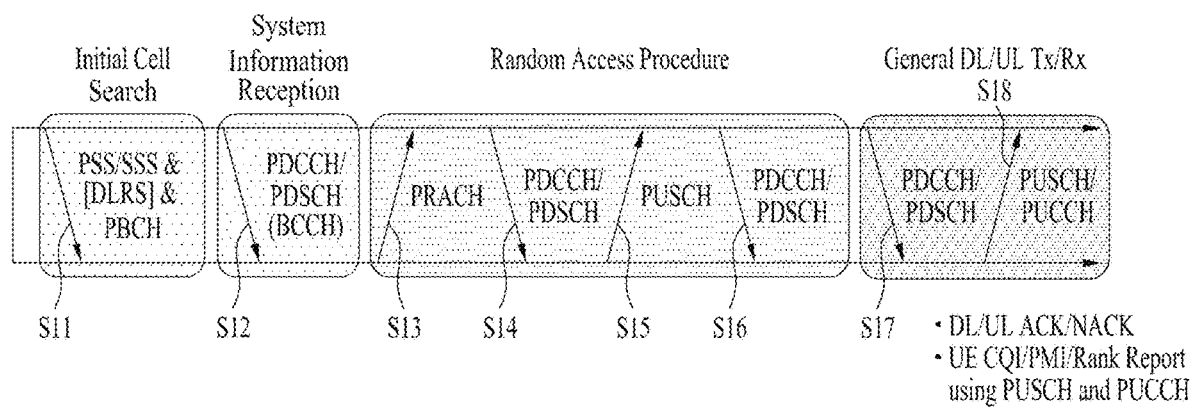

[FIG. 2]
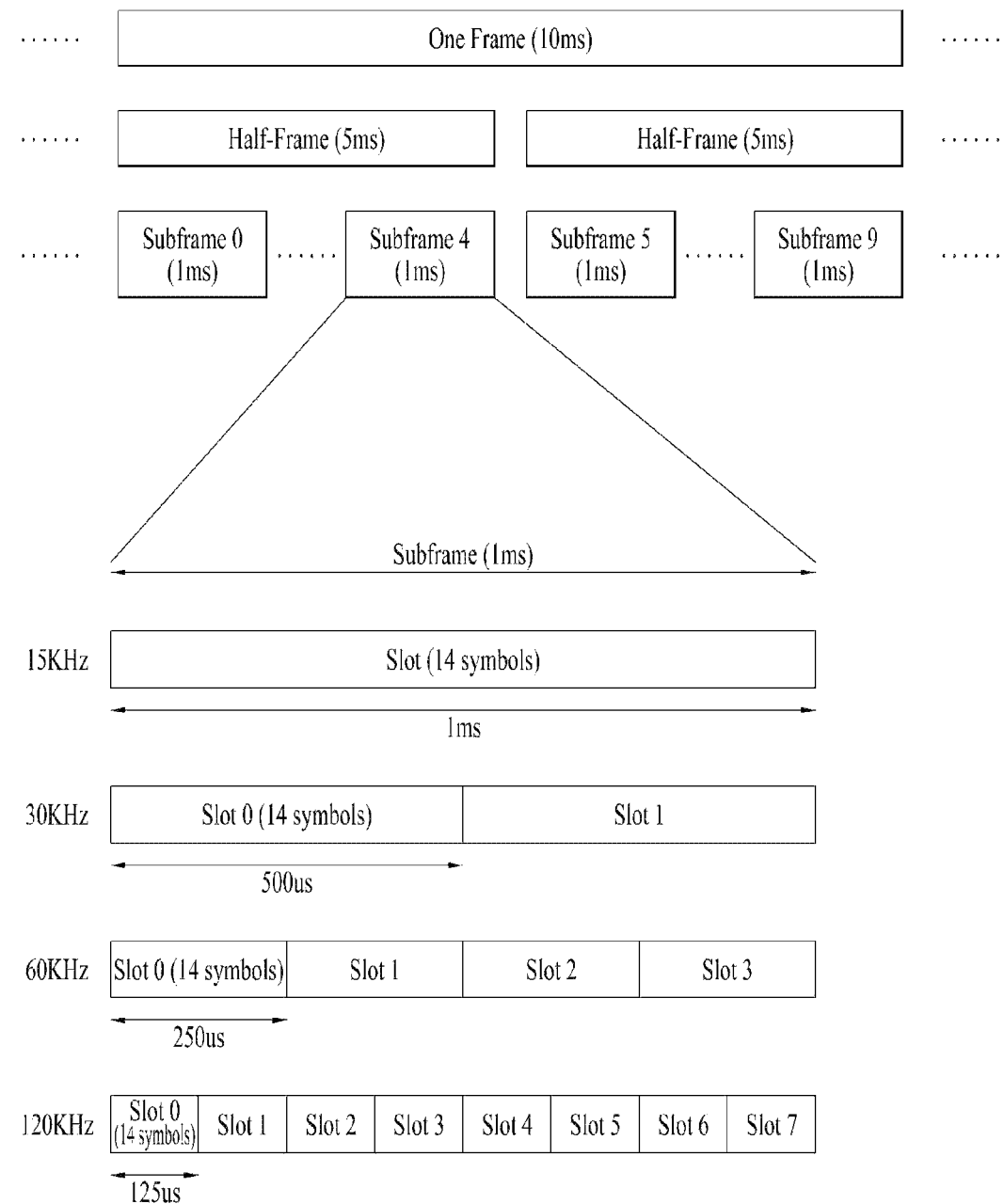

[FIG. 3]
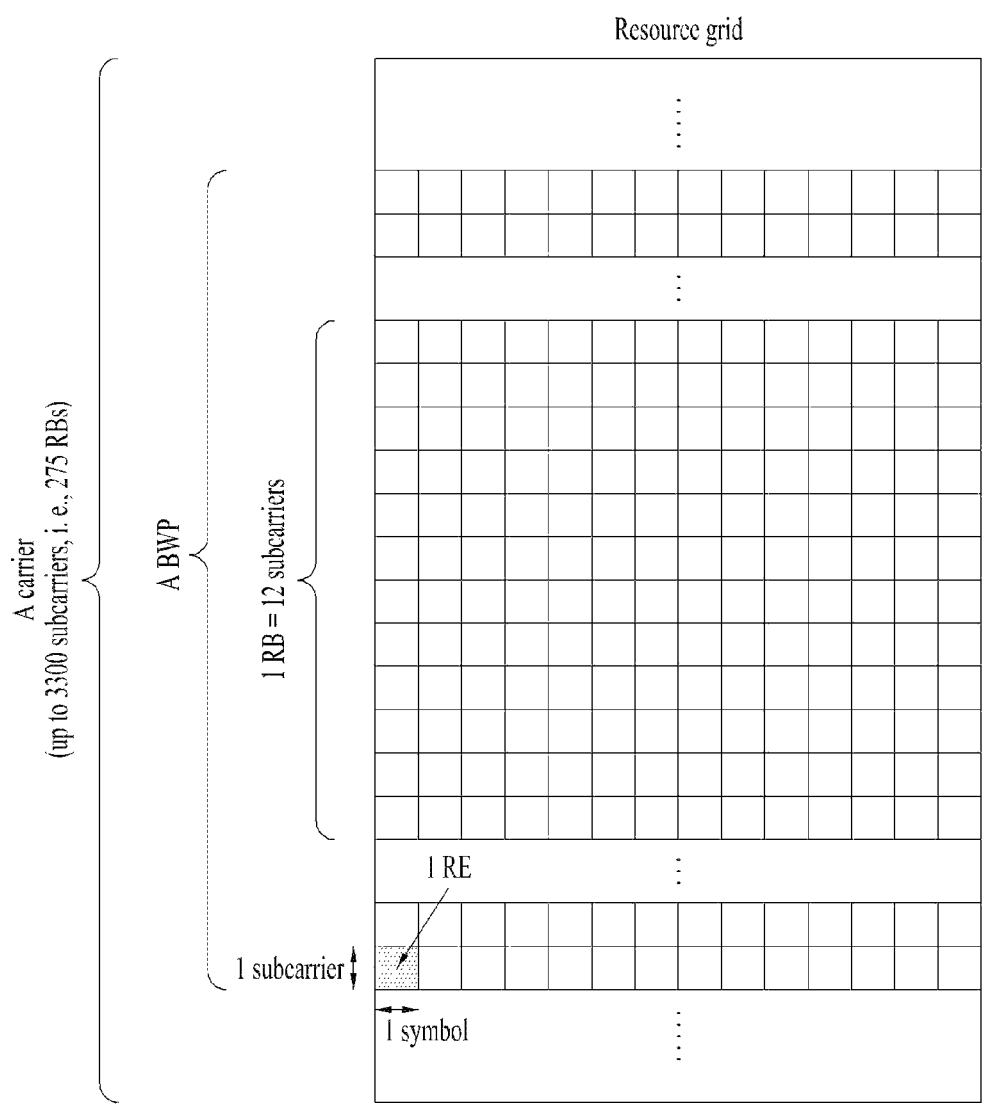

【FIG. 4】
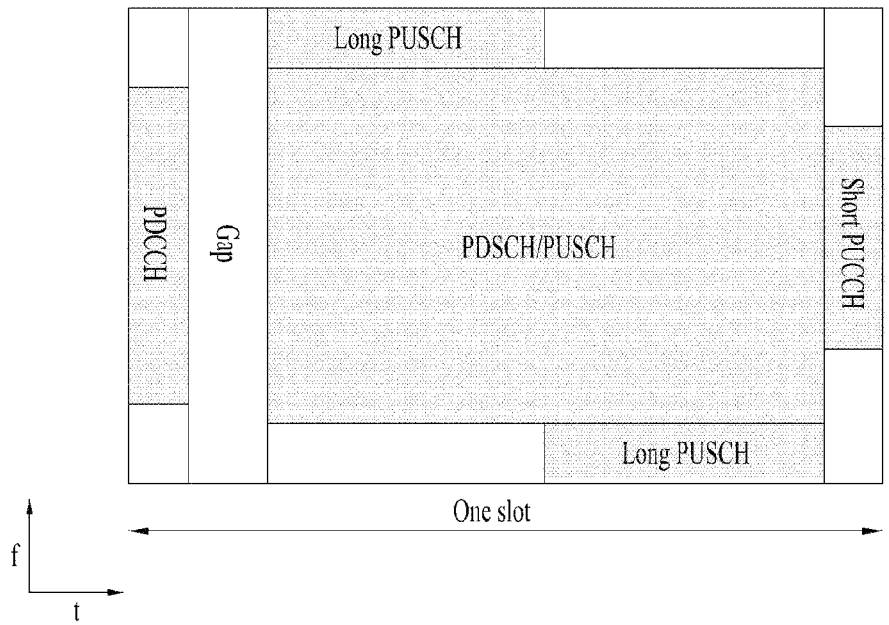
【FIG. 5】
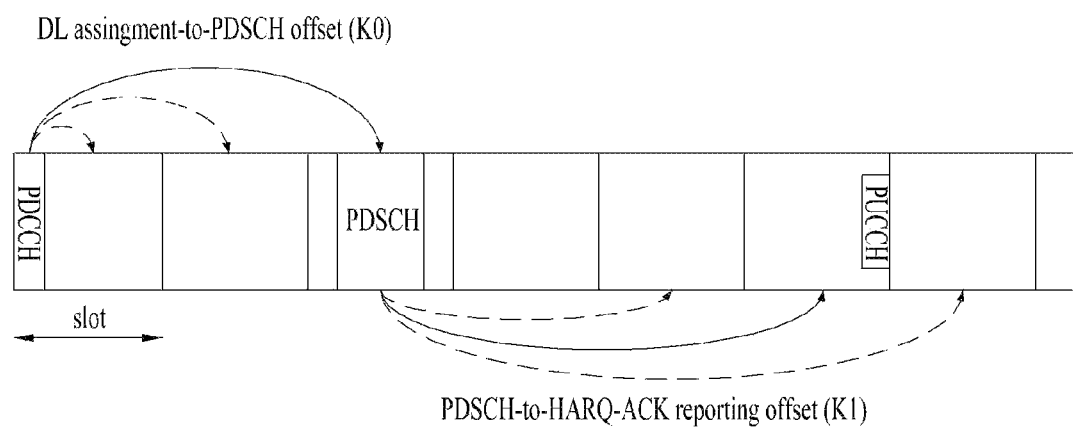

【FIG. 6】
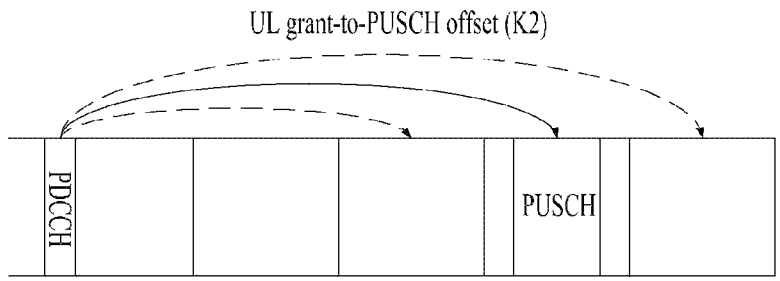
【FIG. 7】
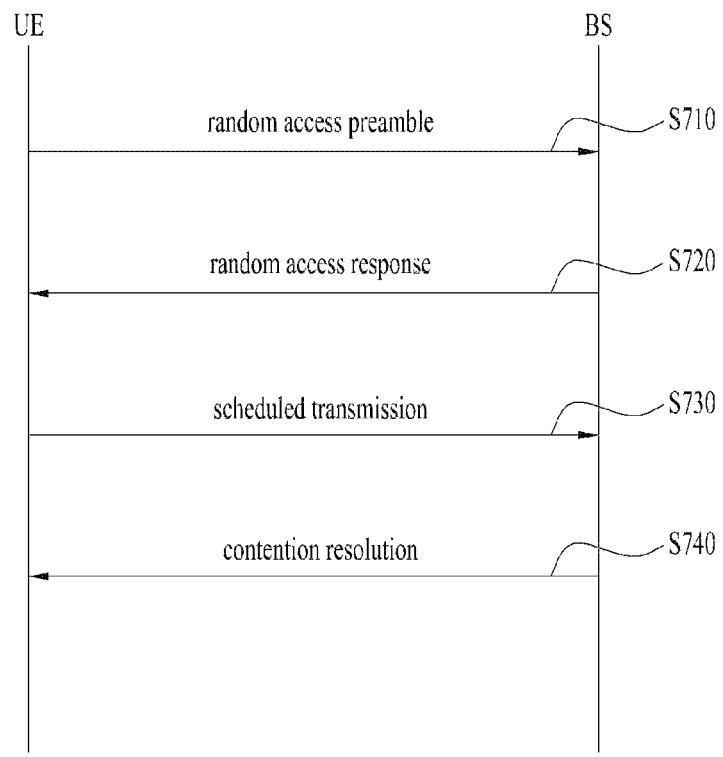

【FIG. 8】
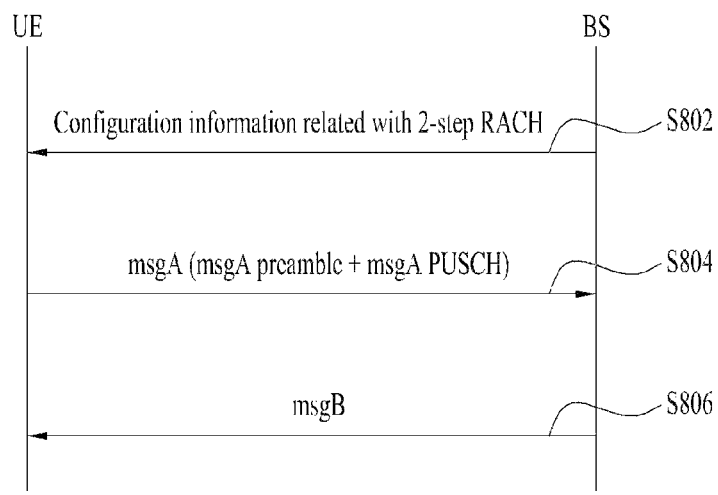
【FIG. 9】
| RO#0 | ------ | PO#0A | PO#0B |
| RO#1 | ------ | PO#1A | PO#1B |
| RO#2 | ------ | PO#2A | PO#2B |
| RO#3 | ------ | PO#3A | PO#3B |
Scheme 1-1
| RO#0 | ------ | PO#0 (1bit UCI field) |
| RO#1 | ------ | PO#1 (1bit UCI field) |
| RO#2 | ------ | PO#2 (1bit UCI field) |
| RO#3 | ------ | PO#3 (1bit UCI field) |
Scheme 1-2

[FIG. 10]
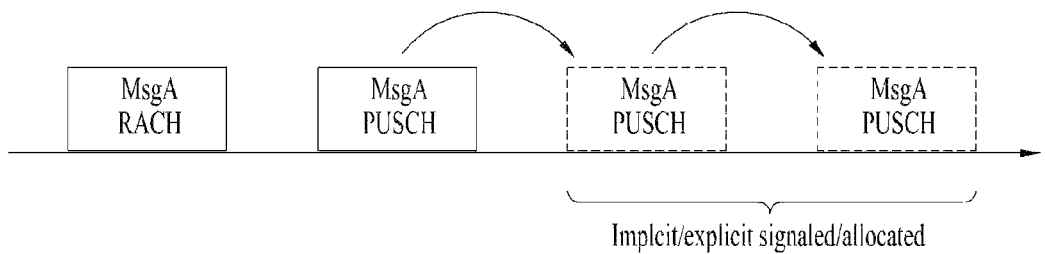
[FIG. 11]
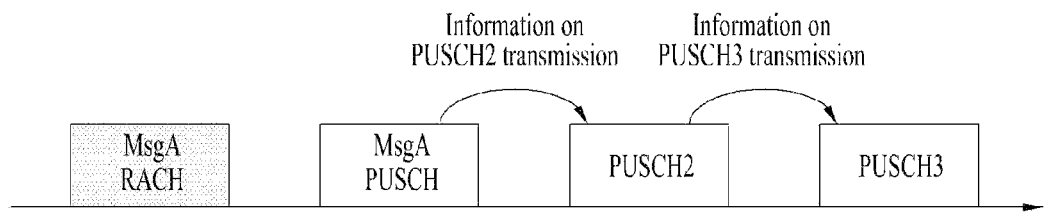
[FIG. 12]
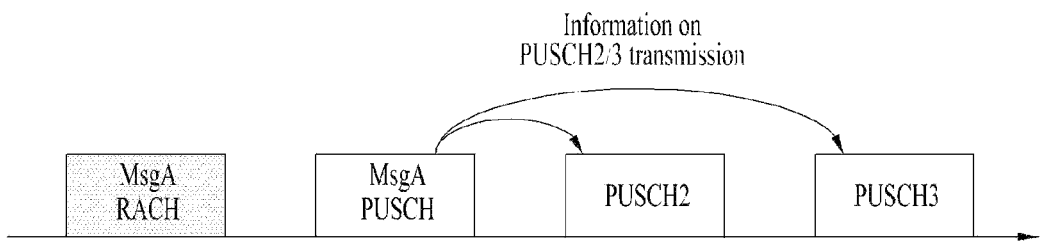
[FIG. 13]
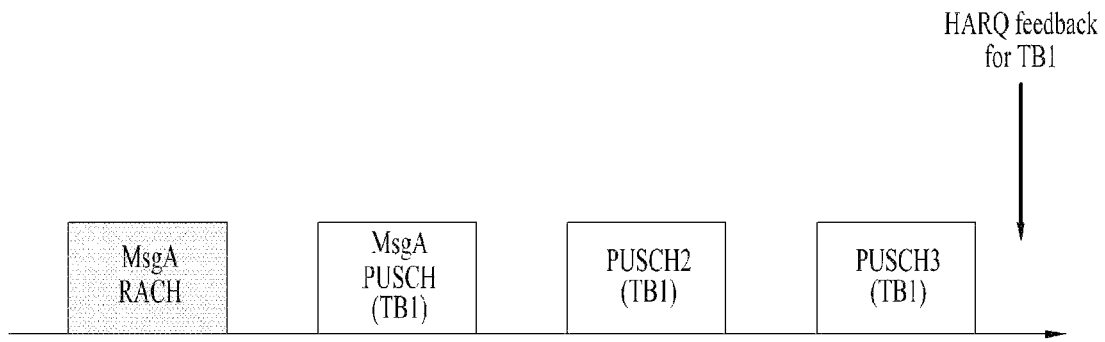

【FIG. 14】
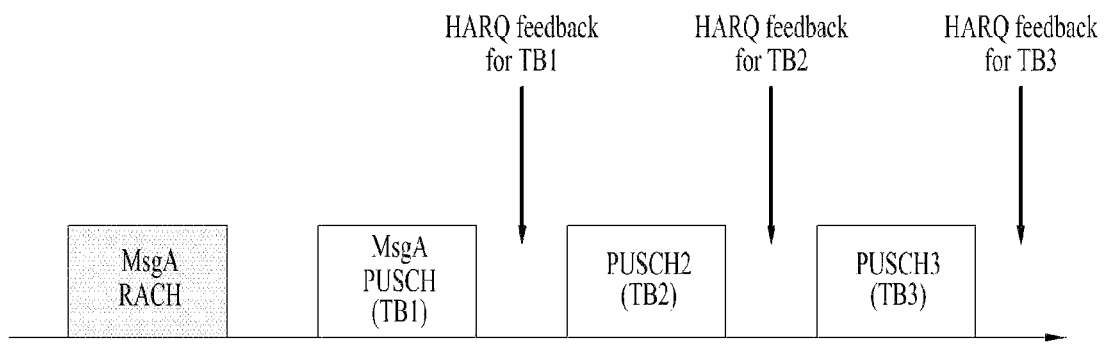
【FIG. 15】
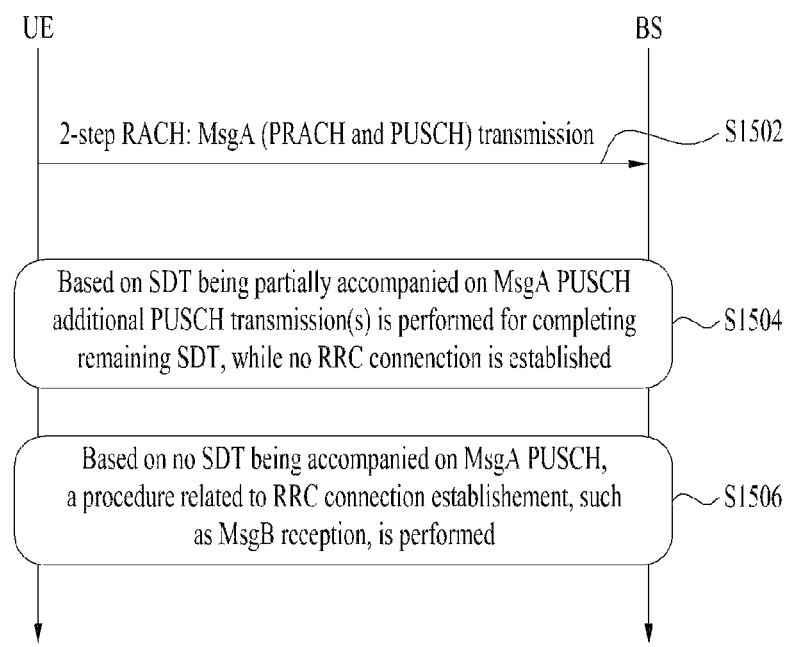

【FIG. 16】
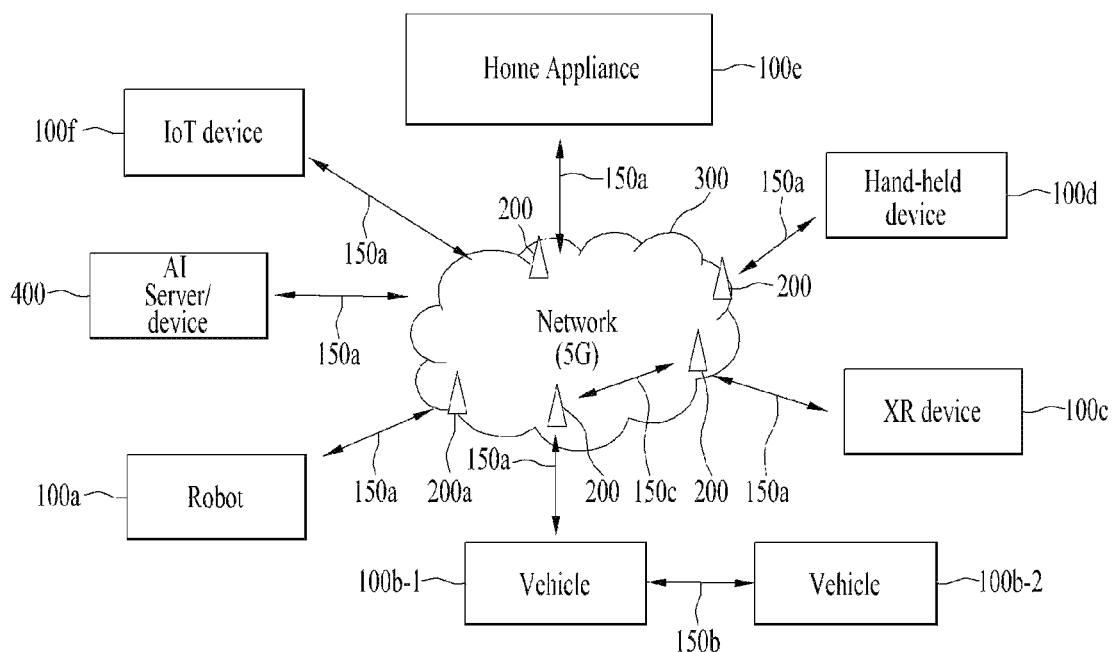
【FIG. 17】
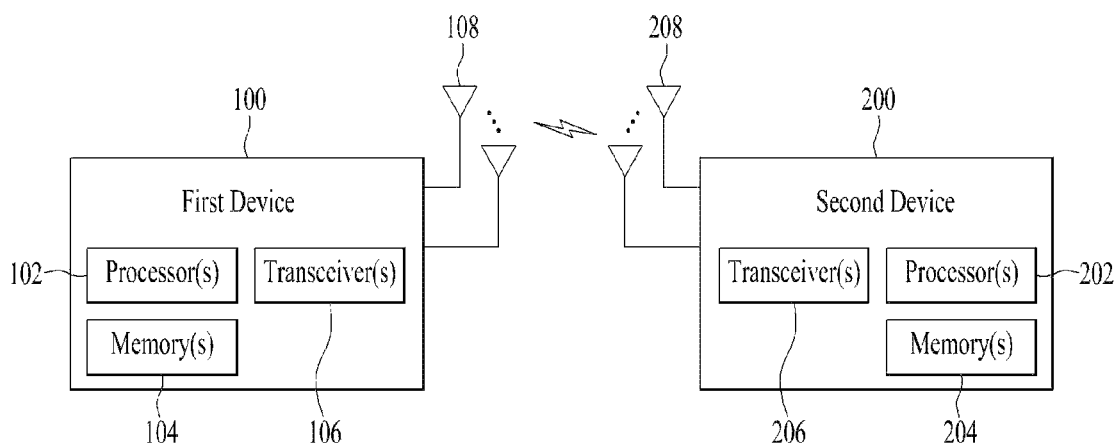

【FIG. 18】
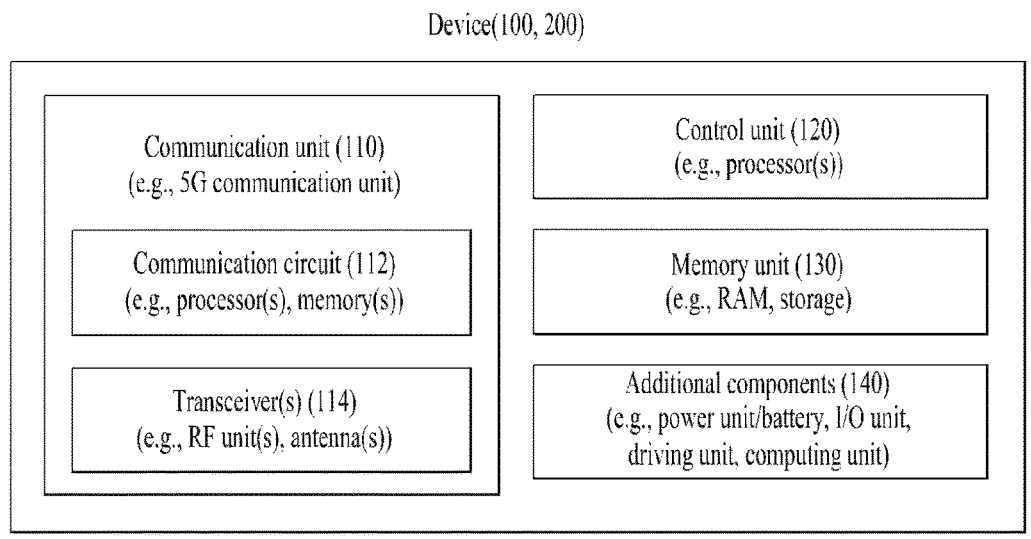
【FIG. 19】
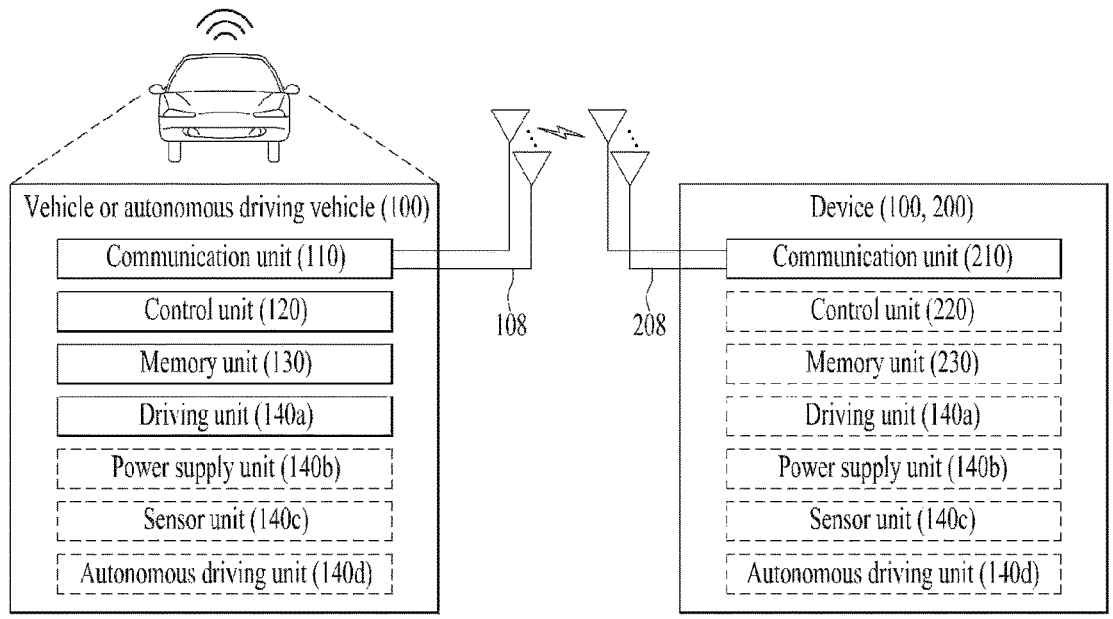

METHOD AND APPARATUS FOR TRANSMITTING AND RECEIVING WIRELESS SIGNAL IN WIRELESS COMMUNICATION SYSTEM

This application is the National Stage filing under 35 U.S.C. 371 of International Application No. PCT/KR2020/015891 filed on Nov. 12, 2020, which claims priority to Korean Patent Application No. 10-2019-0144475 filed on Nov. 12, 2019, the contents of which are all hereby incorporated by reference herein in their entirety.

TECHNICAL FIELD

The present disclosure relates to a wireless communication system, and more particularly, to a method and apparatus for transmitting and receiving a wireless signal.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Task

An aspect of the present disclosure is to provide a method and apparatus for efficiently transmitting and receiving a wireless signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In a first technical aspect of the present disclosure, provided is a method performed by a user equipment in a wireless communication system, the method including transmitting a Message A (MsgA) to a base station as a part of a 2-step Random Access (RA) procedure, the MsgA including a Physical Random Access Channel (PRACH) and a first Physical Uplink Shared Channel (PUSCH), based on that the first PUSCH is accompanied by a Small Data Transmission (SDT) transmission and that the SDT transmission is a part of SDT data, additionally transmitting the rest of the SDT data to the base station through one or more second PUSCHs in a state that there is no Radio Resource Control (RRC) connection to the base station, and based on that the first PUSCH is not accompanied by the SDT transmission, performing a procedure for the RRC connection to the base station.

In a second technical aspect of the present disclosure, provided is a user equipment used in a wireless communication system, the user equipment including at least one transceiver, at least one processor, and at least one computer memory operably connected to the at least one processor and enabling the at least one processor to perform an operation when executed, the operation including transmitting a Message A (MsgA) to a base station as a part of a 2-step Random Access (RA) procedure, the MsgA including a Physical Random Access Channel (PRACH) and a first Physical Uplink Shared Channel (PUSCH), based on that the first PUSCH is accompanied by a Small Data Transmission (SDT) transmission and that the SDT transmission is a part of SDT data, additionally transmitting the rest of the SDT data to the base station through one or more second PUSCHs in a state that there is no Radio Resource Control (RRC) connection to the base station, and based on that the first PUSCH is not accompanied by the SDT transmission, performing a procedure for the RRC connection to the base station.

In a third technical aspect of the present disclosure, provided is an apparatus for a user equipment, the apparatus including at least one processor and at least one computer memory operably connected to the at least one processor and enabling the at least one processor to perform an operation when executed, the operation including transmitting a Message A (MsgA) to a base station as a part of a 2-step Random Access (RA) procedure, the MsgA including a Physical Random Access Channel (PRACH) and a first Physical Uplink Shared Channel (PUSCH), based on that the first PUSCH is accompanied by a Small Data Transmission (SDT) transmission and that the SDT transmission is a part of SDT data, additionally transmitting the rest of the SDT data to the base station through one or more second PUSCHs in a state that there is no Radio Resource Control (RRC) connection to the base station, and based on that the first PUSCH is not accompanied by the SDT transmission, performing a procedure for the RRC connection to the base station.

In a fourth technical aspect of the present disclosure, provided is a computer-readable storage medium including at least one computer program enabling at least one processor to perform an operation when executed, the operation including transmitting a Message A (MsgA) to a base station as a part of a 2-step Random Access (RA) procedure, the MsgA including a Physical Random Access Channel (PRACH) and a first Physical Uplink Shared Channel (PUSCH), based on that the first PUSCH is accompanied by a Small Data Transmission (SDT) transmission and that the SDT transmission is a part of SDT data, additionally transmitting the rest of the SDT data to the base station through one or more second PUSCHs in a state that there is no Radio Resource Control (RRC) connection to the base station, and based on that the first PUSCH is not accompanied by the SDT transmission, performing a procedure for the RRC connection to the base station.

In a fifth technical aspect of the present disclosure, provided is a method performed by a base station in a wireless communication system, the method including receiving a Message A (MsgA) from a user equipment as a part of a 2-step Random Access (RA) procedure, the MsgA including a Physical Random Access Channel (PRACH) and a first Physical Uplink Shared Channel (PUSCH), based on that the first PUSCH is accompanied by a Small Data Transmission (SDT) reception and that the SDT reception is a part of SDT data, additionally receiving the rest of the SDT data from the user equipment through one or more second PUSCHs in a state that there is no Radio Resource Control (RRC) connection to the user equipment, and based on that the first PUSCH is not accompanied by the SDT reception, performing a procedure for the RRC connection to the user equipment.

In a sixth technical aspect of the present disclosure, provided is a base station used in a wireless communication system, the base station including at least one transceiver, at least one processor, and at least one computer memory operably connected to the at least one processor and enabling the at least one processor to perform an operation when executed, the operation including receiving a Message A (MsgA) from a user equipment as a part of a 2-step Random Access (RA) procedure, the MsgA including a Physical Random Access Channel (PRACH) and a first Physical Uplink Shared Channel (PUSCH), based on that the first PUSCH is accompanied by a Small Data Transmission (SDT) reception and that the SDT reception is a part of SDT data, additionally receiving the rest of the SDT data from the user equipment through one or more second PUSCHs in a state that there is no Radio Resource Control (RRC) connection to the user equipment, and based on that the first PUSCH is not accompanied by the SDT reception, performing a procedure for the RRC connection to the user equipment.

Preferably, when the one or more second PUSCHs are transmitted, each PUSCH of the first PUSCH and the one or more second PUSCHs may include information on a very next second PUSCH transmission and the information may include at least one of a presence or non-presence of the very next second PUSCH transmission, time resource allocation information, frequency resource allocation information, Transport Block Size (TBS), or Modulation and Coding Scheme (MCS).

Preferably, each of the second PUSCHs may include information used to identify an associated PRACH and the information may include at least one of information related to a resource of the associated PRACH or information related to an associated MsgA transmission timing.

Preferably, based on receiving Acknowledgement (ACK) information on a specific second PUSCH from the base station during transmission of a plurality of the second PUSCHs, a retransmission procedure for previous second PUSCHs including the specific second PUSCH may be terminated (e.g., an HARQ processor buffer is emptied entirely).

Preferably, the reception of the ACK information may include receiving a MsgB in response to the MsgA and the specific second PUSCH may include a second PUSCH transmitted last before the reception of the MsgB.

Advantageous Effects

According to the present disclosure, a wireless signal may be transmitted and received efficiently in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 1 illustrates physical channels used in a 3rd generation partnership project (3GPP) system as an exemplary wireless communication systems and a general signal transmission method using the same.

FIG. 2 illustrates a radio frame structure.

FIG. 3 illustrates a resource grid of a slot.

FIG. 4 illustrates mapping of physical channels in a slot.

FIG. 5 illustrates an acknowledgment/negative acknowledgement (ACK/NACK) transmission process.

FIG. 6 illustrates a physical uplink shared channel (PUSCH) transmission process.

FIG. 7 and FIG. 8 illustrate a Random Access Channel (RACH) procedure.

FIG. 9 illustrates a Small Data Transmission (SDT) classification scheme according to the present disclosure.

FIGS. 10 to 15 illustrate an SDT performing method according to the present disclosure.

FIGS. 16 to 19 illustrate a communication system 1 and wireless devices, which are applied to the present disclosure.

BEST MODE FOR DISCLOSURE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE receives synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 orthogonal frequency division multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The frame structure is merely an example. The number of subframes, the number of slots, and the number of symbols in a frame may vary.

In the NR system, different OFDM numerologies (e.g., SCSs) may be configured for a plurality of cells aggregated for one UE. Accordingly, the (absolute time) duration of a time resource including the same number of symbols (e.g., a subframe (SF), slot, or TTI) (collectively referred to as a time unit (TU) for convenience) may be configured to be different for the aggregated cells. A symbol may be an OFDM symbol (or CP-OFDM symbol) or an SC_FDMA symbol (or a discrete Fourier transform-spread-OFDM (DFT-s-OFDM) symbol).

In NR, various numerologies (or SCSs) are supported to support various 5G services. For example, with an SCS of 15 kHz, a wide area in traditional cellular bands is supported, while with an SCS of 30 kHz/60 kHz, a dense urban area, a lower latency, and a wide carrier bandwidth are supported. With an SCS of 60 kHz or higher, a bandwidth larger than 24.25 GHz is be supported to overcome phase noise.

An NR frequency band may be defined by two types of frequency ranges, FR1 and FR2. FR1 and FR2 may be configured as described in Table 3. FR2 may refer to millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols of a slot may be used for a DL control channel (e.g., PDCCH) (hereinafter, referred to as a DL control region), and the last M symbols of the slot may be used for a UL control channel (e.g., PUCCH) (hereinafter, referred to as a UL control region). Each of N and M is an integer equal to or larger than 0. A resource area (referred to as a data region) between the DL control region and the UL control region may be used for transmission of DL data (e.g., PDSCH) or UL data (e.g., PUSCH). A guard period (GP) provides a time gap for switching between a transmission mode and a reception mode at the BS and the UE. Some symbol at the time of switching from DL to UL may be configured as a GP.

The PDCCH carries downlink control information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., radio network temporary identifier (RNTI)) according to the owner or usage of the PDCCH. For example, if the PDCCH is for a specific UE, the CRC will be masked with a UE identifier (e.g., cell-RNTI (C-RNTI)). If the PDCCH is for paging, the CRC will be masked with a paging-RNTI (P-RNTI)). If the PDCCH is for system information (e.g., a system information block (SIB)), the CRC will be masked with a system information RNTI (SI-RNTI). If the PDCCH is for a random access response, the CRC will be masked with a random access-RNTI (RA-RNTI).

The PUCCH carries uplink control information (UCI). The UCI includes the following information.
  Scheduling Request (SR): Information that is used to request a UL-SCH resource.
  Hybrid Automatic Repeat Request (HARQ)-Acknowledgment (ACK): A response to a downlink data packet (e.g., codeword) on the PDSCH. HARQ-ACK indicates whether the downlink data packet has been successfully received. In response to a single codeword, one bit of HARQ-ACK may be transmitted. In response to two codewords, two bits of HARQ-ACK may be transmitted. The HARQ-ACK response includes positive ACK (simply, ACK), negative ACK (NACK), DTX or NACK/DTX. Here, the HARQ-ACK is used interchangeably used with HARQ ACK/NACK and ACK/NACK.
  Channel State Information (CSI): Feedback information about a downlink channel. Multiple input multiple output (MIMO)-related feedback information includes a rank indicator (RI) and a precoding matrix indicator (PMI).

Table 4 exemplarily shows PUCCH formats. PUCCH formats may be divided into short PUCCHs (Formats 0 and 2) and long PUCCHs (Formats 1, 3, and 4) based on the PUCCH transmission duration.

TABLE 4

| PUCCH format | Length in OFDM symbols $N^{PUCCH}_{symb}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

FIG. 5 illustrates an ACK/NACK transmission procedure. Referring to FIG. 6, the UE may detect a PDCCH in slot #n. Here, the PDCCH includes downlink scheduling information (e.g., DCI format 1_0 or 1_1). The PDCCH indicates a DL assignment-to-PDSCH offset (K0) and a PDSCH-HARQ-ACK reporting offset (K1). For example, DCI format 1_0 or 1_1 may include the following information.
  Frequency domain resource assignment (FDRA): Indicates an RB set assigned to the PDSCH.
  Time domain resource assignment (TDRA): Indicates K0 and the starting position (e.g. OFDM symbol index) and duration (e.g. the number of OFDM symbols) of the PDSCH in a slot. TDRA may be indicated by a start and length indicator value (SLIV).
  PDSCH-to-HARQ_feedback timing indicator: Indicates K1.
  HARQ process number (4 bits): Indicates an HARQ process identify (ID) for data (e.g., PDSCH or TB).
  PUCCH resource indicator (PRI): Indicates PUCCH resources to be used for UCI transmission among a plurality of resources in a PUCCH resource set.

After receiving the PDSCH in slot #(n+K0) according to the scheduling information of slot #n, the UE may transmit UCI on the PUCCH in slot #(n+K1). Here, the UCI includes a HARQ-ACK response to the PDSCH. In the case where the PDSCH is configured to transmit a maximum of one TB, the HARQ-ACK response may be configured in one bit. In the case where the PDSCH is configured to transmit a maximum of two TBs, the HARQ-ACK response may be configured in two bits if spatial bundling is not configured and may be configured in one bit if spatial bundling is configured. When slot #(n+K1) is designated as a HARQ-ACK transmission time for a plurality of PDSCHs, the UCI transmitted in slot #(n+K1) includes HARQ-ACK responses to the plurality of PDSCHs.

FIG. 7 illustrates an exemplary PUSCH transmission process. Referring to FIG. 7, the UE may detect a PDCCH in slot #n. The PDCCH may include UL scheduling information (e.g., DCI format 0_0 or DCI format 0_1). DCI format 0_0 and DCI format 0_1 may include the following information.
  Frequency domain resource assignment: Indicates an RB set allocated to a PUSCH.
  Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB. When PUCCH transmission time and PUSCH transmission time overlaps, UCI can be transmitted via PUSCH (PUSCH piggyback).

Embodiment

In an LTE/NR system, a UE may perform UL transmission through a random access procedure without scheduling of direct UL transmission from a BS (or cell). From the perspective of a UE, the random access procedure in the LTE/NR system includes preamble (or Message1 (Msg1)) transmission, Msg2 reception, Msg3 transmission and Msg4 reception) 4-step RACH). Msg2 is a message over which a BS having received a random preamble allocates a UE resource for a UE having transmitted the corresponding preamble to transmit Msg3, and the UE transmits information of a connection request and the like together with its own Identifier (ID) over the Msg3. Having received the Msg3, the BS transmits the ID of the corresponding UE and necessary informations over Msg4, thereby resolving contention of a random access possibly occurring between different UEs.

FIG. 7 illustrates an existing 4-step RACH process. Referring to FIG. 7, signals/information transmitted in each step and a detailed operation performed in each step are as follows.

1) Msg1 (PRACH): This is transmitted from a UE to a BS [S710]. Each Msg1 may be divided into a time/frequency resource (RACH Occasion (RO) in which a Random Access (RA) preamble is transmitted and an RA Preamble Index (RAPID).

2) Msg2 (Random Access Response (RAR)): This is a response message to the Msg1, and is transmitted to the UE from the BS [S720]. For Msg2 reception, the UE may perform PDCCH monitoring to check whether an RA-RNTI-based PDCCH (e.g., a CRC of PDCCH is masked with RA-RNTI) is in a time window (hereinafter, an RAR window) related to the MSg1. In case of receiving the PDCCH masked with the RA-RNTI, the UE may receive an RAR on PDSCH indicated by RA-RNTI PDCCH. The RA-RNTI may be determined as follows.

$$\text{RA-RNTI}=1+s\_id+14 \times t\_id+14*80*f\_id+14*80*8*ul\_carrier\_id \quad \text{[Equation 1]}$$

Here, s_id indicates an index (e.g., 0-13) of a first OFDM symbol of PRACH, t_id indicates an index (e.g., 0-79) of a first slot of PRACH in a frame, fid indicates a frequency resource index (e.g., 0-7) of PRACH, ul_carrier_id indicates a UL carrier (type) (e.g., 0-1) (e.g., 0 for Normal Uplink (NUL) carrier, 1 for Supplementary Uplink (SUL) carrier) used for PRACH transmission. s_id corresponds to a beam, and t_id/f_id corresponds to a time-frequency resource (3.g., RO) used for PRACH transmission.

3) Msg3 (PUSCH): This is transmitted from the UE to the BS [S730]. The Msg3 is performed based on a UL grant in the RAR. The Msg3 may include contention resolution Identity (ID) (and/or Buffer Status Report (BSR)) information, an RRC connection request, etc.). Retransmission according to an HARQ process may apply to the Msgg3 (PUSCH). Here, the contention resolution ID includes a UL Common Control Channel (CCCH) Service Data Unit (SDU). When the UL CCCH SDU is larger than 48 bits, first 48 bits of the UL CCCH SDU may be included in the Msg3.

4) Msg4 (PDSCH): This is transmitted from the BS to the UE [S740]. The Msg4 may include UE (global) ID (and/or RRC connection related information) for contention resolution. Based on the Msg4, success or failure in contention resolution may be determined.

If the Msg2/Msg4 is not received successfully, the UE retransmits the Msg1. In doing so, the UE raises a transmit power of the Msg1 (power ramping) and increases an RACH retransmission counter. Once a value of the RACH retransmission counter reaches a maximum value, the RACH process is determined as complete failure. In this case, the UE may perform random backoff and newly initiate an RACH process by initializing an RACH related parameter (e.g., an RACH retransmission counter).

Since the UE and BS exchange a multitude of messages on the assumption of a contention situation in the 4-step RACH process, a processing delay may occur depending on a presence or non-presence of contention and an access latency may increase.

To enable a fast access in consideration of utilization in a small cell or an unlicensed band by simplifying a processing delay of the 4-step RACH, a 2-step RACH shown in FIG. 8 may be taken into consideration. First, a UE may receive configuration information (e.g., over system information) related to 2-step RACH from a BS [S802]. Thereafter, the UE directly transmits a message corresponding to Msg3 together with an RA preamble [S804], and the BS responds to it using a message corresponding to Msg2 and Msg4 to resolve contention [S806]. In the 2-step RACH scheme, a whole message corresponding to a preamble and Msg3 is referred to as MsgA and a whole message including contents of Msg2 and Msg4 is referred to as MsgB. The MsgA includes a MsgA preamble and MsgA PUSCH (corresponding to Msg3). For convenience, a time-frequency resource capable of transmitting a MsgA preamble is referred to as an RACH Occasion (RO), and a time-frequency resource capable of transmitting MsgA PUSCH is referred to as a PUSCH Occasion (PO). In addition, the MsgA preamble may be used with MsgA (P), (P)PRACH, (RACH) preamble, etc.

It takes a lot of signaling overhead and long time for a UE in (RRC) inactive mode (or Idle mode, for convenience, commonly called an inactive mode) to make an RRC connection to transmit data to a BS, disconnect the RRC connection after completion of the data transmission and return to the idle/inactive mode. Therefore, in order to transmit relatively short data, it may be efficient to transmit data directly in continuation with RACH transmission (e.g., PRACH transmission) in inactive mode. In the present specification, a scheme of performing RACH transmission and subsequent data transmission without establishing an RRC connection by a UE in inactive mode is referred to as a Small Data Transmission (SDT) scheme. In addition, for convenience, an RACH transmission scheme not accompanied by data transmission (or a scheme of RACH transmission and subsequent data transmission, accompanied by RRC connection) is referred to as a non-SDT scheme. 'Not accompanied by data transmission' may mean 'not accompanied by data other than control data for operating a Radio Access Network (RAN) or a network core) or 'not accompanied by data other than control data (e.g., RRC connection request) for establishing RRC connection'. Alternatively, 'not accompanied by data transmission' may mean 'not accompanied by user traffic at other application levels (control data for operating an RAN or network core or control data for establishing RRC connection). Therefore, data accompanied in SDT (hereinafter, SDT data) may include user-plane data for example, and more particularly, user traffic data (of application level). For convenience, data other than SDT data will be referred to as non-SDT data to be distinguished from SDT data.

For example, in the SDT scheme, in case of 2-step RACH, SDT data may be included in MsgA (e.g., PUSCH) instead of an RRC connection request that is a control message. In this case, if a BS receives MsgA from a UE, an RACH process is terminated as successful and the BS may not transmit MsgB to the UE. Meanwhile, in a non-SDT scheme, an RRC connection request that is a control message may be included in MsgA (e.g., PUSCH). In this case, if the BS receives MsgA from the UE, the BS may transmit MsgB to the UE. Thereafter, the UE may transmit data (e.g., UL-SCH data) to the BS based on UE resource allocation of the BS.

Hereinafter, schemes for an efficient SDT operation are proposed in the present specification.

The proposal of the present specification may apply to a UE in (RRC) connected mode as well without being limited to a UE in (RRC) inactive/idle mode. In addition, the proposal of the present specification may apply to an RACH procedure (e.g., 4-step, etc.) as well as to a 2-step RACH procedure.

Section 1: Discrimination Between SDT Transmission and Non-SDT Transmission

When an RACH resource for SDT transmission is used separately from an RACH resource for non-SDT transmission, it is disadvantageous in that RACH resource overhead that should be operated by a network (or BS) increases too much. Hence, the BS may operate an RACH resource for SDT transmission usage and an RACH resource for non-SDT transmission usage without separately discriminating them. Yet, when a UE transmits (P)RACH, the BS needs to know whether the corresponding RACH (procedure) is for non-SDT usage or SDT usage for a subsequent operation. When the RACH procedure is for SDT, MsgA PUSCH may be accompanied by SDT transmission. For example, the UE includes SDT data in MsgA PUSCH, and the BS may obtain the SDT data from the MsgA PUSCH. Based on obtaining the SDT data, the RACH procedure is terminated and MsgB transmission does not occur. A specific operation for SDT transmission/reception may refer to the proposal after Section 2. On the other hand, when the RACH procedure is for non-SDT, the RCH procedure (e.g., MsgA PUSCH) is not accompanied by SDT transmission. IN this case, the UE may perform a procedure for receiving MsgB according to the existing 2-step RACH procedure. In addition, through the 2-step RACH (e.g., based on an RRC connection request in MsgA PUSCH), the UE may establish RRC connection with the BS.

Hereinafter, a method of distinguishing a presence or non-presence of (non-) SDT transmission based on an RACH procedure will be described with reference to FIG. 9, by which the following is non-limited. The presence or non-presence of (non-)SDT transmission may be distinguished based on MsgA, e.g., a transmission resource related to MsgA or information in MsgA.

Method 1-1) Discrimination Between SDT Transmission and Non-SDT Transmission Over an MsgA PUSCH Resource In this method, a BS may independently configure a PUSCH resource (PO; or PUSCH classified into a PUSCH DM-RS sequence (e.g., a base sequence, a cyclic shift (CS), a PUSCH scrambling sequence, a PUSCH CRC scrambling RNTI, etc. on a same PO) corresponding to a same RACH resource (RO; or (P)RACH classified into a preamble sequence, a cyclic shift, a scrambling, etc. on a same RO) with respect to SDT transmission and non-SDT transmission. For example, referring to FIG. 9, a plurality of POs (PO #XA and PO #XB) may be configured for one RO (RO #X). (Here, PO #XA may be configured for SDT transmission and PO #XB may be configured for non-SDT transmission.) A PUSCH scrambling sequence may mean a sequence used to scramble PUSCH (signal/data) or an initialization/seed value used to generate a scrambling sequence. A PUSCH CRC scrambling RNTI means an RNTI used to scramble a CRC of PUSCH (signal/data). In this case, although a UE transmits MsgA RACH over a same RACH resource irrespective of a presence or non-presence of SDT transmission, it may transmit subsequent MsgA PUSCH over a PO or PUSCH resource configured for each transmission depending on whether to perform SDT transmission or non-SDT transmission. For example, a PUSCH resource for SDT and a PUSCH resource for non-SDT may be configured differently for each RACH resource. In this case, if a BS detects (P)RACH reception from an RACH resource, the BS may attempt PUSCH reception on two PUSCH resources corresponding to the RACH resource. Depending on the PUSCH detection result, the BS may determine whether a corresponding RACH procedure/transmission is for SDT or non-SDT and then perform a subsequent operation. If the RACH procedure is for SDT, the subsequent operation of the BS may include SDT data reception and MsgB transmission (skippable) for example. In addition, if a UE performs an RACH procedure in (RRC) inactive/idle mode, it may maintain the original mode without RRC connection to the BS. On the other hand, if the RACH procedure is for non-SDT, the subsequent operation of the BS includes MsgB transmission for example but does not include an SDT data reception operation. In addition, if the RACH procedure is for non-SDT, the UE may establish RRC connection to the BS and transmit data based on UL resource allocation of the BS after the RRC connection.

Method 1-2) Discrimination Between SDT Transmission and Non-SDT Transmission Over UCI in MsgA PUSCH MsgA PUSCH may be transmitted in a manner of multiplexing (i) an encoded bit of UL-SCH data and (ii) separately encoded UCI together. In this method, a UE may inform a BS whether the corresponding MsgA PUSCH is transmission for an SDT operation or a non-SDT operation over the corresponding UCI. For example, referring to FIG. 9, a plurality of POs (PO #X) are configured for a single RI (RO #X), and SDT and non-SDT may be discriminated over a specific 1-bit field included in UCI transmitted over MsgA PUSCH.

If detecting (P)RACH from a random RACH resource, the BS may determine whether the corresponding transmission (i.e., MsgA PUSCH transmission) is for SDT or non-SDT by decoding a UCI received over a MsgA PUSCH resource corresponding to the RACH resource and then perform a subsequent operation. If an RACH procedure is for SDT, the subsequent operation of the BS may include SDT data reception and MsgB transmission (skippable) for example. In addition, if the UE performs an RACH procedure in (RRC) inactive/idle mode, it may maintain the original mode without RRC connection to the BS. On the other hand, if the RACH procedure is for non-SDT, the subsequent operation of the BS includes MsgB transmission for example but does not include an SDT data reception operation. In addition, if the RACH procedure is for non- SDT, the UE may establish RRC connection to the BS and transmit data based on UL resource allocation of the BS after the RRC connection.

Section 2: Extension of SDT PUSCH Transmission

Although an SDT operation is mainly aimed at transmitting a small amount of data, PUSCH transmission through one PO may be insufficient for necessary data transmission. Therefore, the present specification proposes the following.

Method 2-1) Transmitting a plurality of PUSCHs by a UE through a plurality of MsgA POs after MsgA RACH transmission.

In this method, a UE may transmit a necessary amount of SDT data by selectively transmitting one or a plurality of MsgA PUSCHs depending on an amount of SDT data to transmit. In doing so, a BS may correctly receive all subsequent SDT data only if knowing how many MsgA PUSCHs are subsequently transmitted by the UE having transmitted MsgA RACH. To this end, the following methods are proposed.

Method 2-1-1) A BS configures a plurality of MsgA PUSCH resources for a random MsgA RACH resource. A UE transmits a number of PUSCHs necessary for data transmission through a plurality of the MsgA PUSCH resources configured for a MsgA RACH transmitted resource.

In this method, if detecting RACH reception from a random MsgA RACH resource, a BS may determine whether PUSCH is actually transmitted on each resource through DM-RS detection and the like on MsgA PUSCH resources configured for a corresponding RACH resource and attempt PUSCH decoding. Referring to FIG. 10, regarding a plurality of MsgA PUSCH resources, (1) all of a plurality of MsgA PUSCH resources may be allocated by a BS explicitly/directly, or (2) one MsgA PUSCH resource is explicitly allocated and the rest of the MsgA PUSCH resources may be implicitly/indirectly allocated based on a predefined rule or additional information (e.g., time/frequency/resource index offset information). PUSCH configuration information (e.g., PUSCH DM-RS sequence (e.g., CS), PUSCH scrambling g sequence, PUSCH CRC scrambling g RNTI) may be configured as the same for a plurality of MsgA PUSCH resources/transmissions or may be configured differently per MsgA PUSCH resource/transmission. In the latter case, a change/hopping pattern of the PUSCH configuration information may be associated with a MsgA PUSCH resource/transmission order. For example, a PUSCH DM-RS hopping pattern may be associated with a MsgA PUSCH resource/transmission order. To announce an end of SDT data transmission, a predefined DM-RS may be used. Here, the predefined DM-RS (CS) (e.g., CSI) may be defined to have prescribed relationship with a DM-RS)CS) (e.g., CS2) of a first PUSCH (e.g., CS2=CS1+n, where n is a predefined integer).

Method 2-1-2) A UE delivers information on subsequent PUSCH transmission to a BS through MsgA PUSCH.

In this method, a UE may inform a BS of information (PUSCH (time/frequency) resource, Transport Block Size (TBS), Modulation and Coding Scheme (MCS), etc.) on subsequent PUSCH transmission over a MAC message encoded together with MsgA PUSCH data or a UCI transmitted together with PUSCH data. Specifically, after MsgA RACH transmission, the UE may inform the BS of information on a serially subsequent PUSCH transmission in each PUSCH transmission [FIG. 11]. Alternatively, in a specific PUSCH transmission corresponding to MsgA RACH transmission, the UE may inform the BS of information on each of the rest of subsequent PUSCH transmissions or transmission information commonly applicable thereto [FIG. 12]. Alternatively, by combining FIG. 11 and FIG. 12 together, in a specific PUSCH transmission corresponding to MsgA RACH transmission, common transmission information applied to the rest of subsequent PUSCH transmissions is indicated, and individual/additional/change information on a serially subsequent PUSCH transmission may be indicated in each PUSCH transmission, by which the following is non-limited. For example, common information may include frequency resource allocation information (e.g., RB allocation information) and individual information may include time resource allocation information (e.g., slot/symbol offset), TBS, MCS, etc. In addition, common information may include reference information and individual information may include an offset/difference value for reference/base information. For example, common information may include reference TB S, reference MCS, etc. and individual information may include TBS difference (beta TBS), MCS difference (beta MCS), etc. In addition, common in formation may include information on the total number of PUSCH transmissions, and individual information may include information on the order of a corresponding PUSCH transmission.

Method 2-1-3) A UE delivers information on a subsequent necessary PUSCH transmission amount through MsgA PUSCH or MsgA RACH. A BS allocates one or a plurality of PUSCH resources through MsgB transmitted in response to MsgA.

In this method, a UE may deliver information on a presence or non-presence of necessity for an additional PUSCH transmission and/or a necessary data transmission amount (e.g., Buffer Status Report (BSR) through a MAC message encoded together with MsgA PUSCH data or a UCI transmitted together with PUSCH data. Alternatively, a BS preconfigures different MsgA (P)RACH resources (e.g., a preamble sequence, RO, etc.) to be associated with different necessary PUSCH data amounts and/or PUSCH resource numbers, and the UE may transmit MsgA (P)RACH by selecting a MsgA (P)RACH resource according to an amount of PUSCH data and/or the number of PUSCHs, which should be transmitted by the UE itself. Based on this information, the BS delivers information on a PUSCH resource and the number of resources, which can be (additionally) transmitted by the UE, through MsgB transmitted in response to the corresponding MsgA, and more particularly, through a MAC message in MsgB PDSCH or a DCI for scheduling the MsgB. Having received this information, the UE may transmit a necessary number of PUSCHs through the corresponding PUSCH resource. In doing so, the BS may give a command for instructing suspension of an additional PUSCH transmission through the DCI for scheduling the MsgB or the MAC message transmitted on the MsgB PDSCH. If receiving the corresponding instruction, the UE may suspend a subsequent PUSCH transmission.

Method 2-1-4) A UE determines a presence or non-presence of necessity for additional PUSCH transmission with reference to a maximum TBS available for MsgA PUSCH transmission.

In a method of delivering a presence or non-presence of necessity for additional PUSCH to a BS by a UE or determining a presence or non-presence of additional PUSCH transmission by a UE itself like the above methods, the UE may determine a presence or non-presence of necessity for additional PUSCH transmission depending on whether TBSreq is greater than TBSmax or whether TBSreq is greater than a specific value, which results from comparing TBSreq that is a Transport Block Size (TBS) (or a data amount), which is to be currently transmitted by the UE, with TBSmax that is a maximum TBS allowed for PUSCH transmission on a single MsgA PUSCH resource.

Method 2-1-5) A UE includes information indicating MsgA PRACH corresponding to additional PUSCH in transmission of the additional PUSCH.

Like the above methods, when a UE transmits additional PUSCH in continuation with transmissions of MsgA PRACH and MsgA PUSCH, the UE may transmit information used to identify an associated MsgA PRACH, e.g., information on a MsgA PRACH resource/preamble ID corresponding to the PUSCH, and/or information (e.g., frame/slot index, RA-RNTI) capable of classifying a corresponding MsgA (PRACH) transmission timing through the additional PUSCH. For example, the information used to identify the associated MsgA PRACH may be indicated through a UCI or PUSCH MAC message, a scrambling sequence for PUSCH, a DM-RS resource/sequence, or the like. If so, although a BS misses some PUSCH transmitted after MsgA PRACH by the UE, the BS may perform a 2-step RACH reception operation by determining that other PUSCHs are associated with the corresponding MsgA PRACH.

Section 3: HARQ Operation for Additional SDT PUSCH Transmission

When a UE transmits a plurality of PUSCHs in continuation with MsgA RACH transmission like Section 2, it is necessary to define an efficient HARQ operation.

Method 3-1) A UE transmits encoding data of a single TB through a plurality of PUSCH transmissions subsequent to MsgA RACH transmission.

In this method, a UE may transmit data of encoding a single TB across a plurality of PUSCH transmissions. Alternatively, when a plurality of TBs can be transmitted through a single PUSCH in a manner of multi-layer transmission and the like, each TB transmitted through a different layer may be transmitted across a plurality of PUSCH transmissions. In doing so, a BS may delver HARQ feedback on the corresponding TB(s) after the end of a last PUSCH transmission. If the corresponding HARQ feedback is ACK, the UE determines that the transmission of the corresponding TB is successful and may empty a Tx buffer of a corresponding HARQ process without performing retransmission or store other data that requires transmission afterward. FIG. 13 shows a proposed operation. Alternatively, (when a single TB is repeatedly transmitted on each PUSCH), a UE detects HARQ feedback from each PUSCH transmission. If detecting ACK for a random PUSCH, the UE determines that the transmission of the corresponding TB is successful and may empty a Tx buffer of a corresponding HARQ process without performing transmission and retransmission of the rest of PUSCHs or store other data that requires transmission afterward.

The role of the ACK in the above HARQ feedback may be replaced by MsgB transmitted by the BS in response to MsgA.

Method 3-2) A UE transmits a different TB for each PUSCH through a plurality of PUSCH transmissions subsequent to MsgA RACH transmission.

In this method, a UE transmits a different TB encoded separately for each PUSCH. In doing so, a BS may delver HARQ feedback on the corresponding TB(s) with respect to each PUSCH transmission, and the UE may independently perform retransmission for each PUSCH depending on the corresponding HARQ feedback. In doing so, when HARQ feedback for a random PUSCH transmission is ACK, the UE determines that (i) the corresponding PUSCH and (ii) PUSCHs prior to the corresponding PUSCH succeed in transmission of TB and may empty TX buffer(s) of the corresponding HARQ process(es) without performing retransmission. FIG. 14 shows a proposed operation. For example, although the UE fails to receive HARQ feedback on TB2 in FIG. 12, If the UE detects ACK feedback on TB3, the UE regards TB1 transmission and TB2 transmission as successful and may empty TX buffers of the corresponding HARQ processes or store other data that require transmission afterward. A role of ACK in the above HARQ feedback may be replaced by MsgB transmitted by the BS in response to MsgA. For example, when MsgB is transmitted after a specific PUSCH (e.g., a last PUSCH), it may mean that all PUSCHs transmitted at the appropriate timing between MsgA transmission and MsgB reception are correctly received by the BS, or HARQ-ACK information on the corresponding PUSCHs may be directly transmitted through MsgB. In the former case, if the specific PUSCH is not the last PUSCH, the BS may transmit HARQ feedback (e.g., MsgB) with respect to PUSCH received after MsgB.

For convenience, to help the understanding of the present disclosure, the proposal of the specification is described in different sections, but the methods described in the respective sections can be used in combination.

FIG. 15 illustrates an SDT performing method according to one example of the present disclosure. Referring to FIG. 15, a UE may transmit MsgA to a BS as a part of a 2-step RA procedure [S1502]. Here, the MsgA may include a PRACH and a first PUSCH. In this case, based on that the first PUSCH is accompanied by SDT transmission and that the SDT transmission is a part of SDT data, the UE may additionally transmit the rest of the SDT data to the BS through one or more second PUSCHs in a state that there is no RRC connection to the BS [S1504]. On the other hand, based on that the first PUSCH is not accompanied by the SDT transmission, the UE may perform a procedure (e.g., a MsgB receiving procedure) for RRC connection to the BS [S1506].

In some implementations, when the one or more second PUSCHs are transmitted, each PUSCH among the first PUSCH and the one or more second PUSCHs may include information on a very next second PUSCH transmission and the information may include at least one of a presence or non-presence of the very next second PUSCH transmission, time resource allocation information, frequency resource allocation information, TBS and MCS (see Method 2-1-2). In addition, each of the second PUSCHs includes information used to identify an associated PRACH, and the information may include at least one of information related to a resource of the associated PRACH and information related to an associated MsgA transmission timing (see Method 2-1-5). In addition, based on receiving ACK information on a specific second PUSCH from a BS during transmission of a plurality of the second PUSCHs, terminating a retransmission procedure for the specific second PUSCH and the second PUSCHs prior to the specific second PUSCH (e.g., emptying all HARQ process buffers) may be included. Here, the reception of the ACK information includes receiving MsgB in response to MsgA and the specific second PUSCH may include a second PUSCH last transmitted before the reception of the MsgB among a plurality of the second PUSCHs (see Method 3-2). In addition, although not illustrated, other methods in Sections 1 to 3 are applicable as well.

The various descriptions, functions, procedures, proposals, methods, and/or operational flowcharts proposals of the present disclosure described above in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 16 illustrates a communication system 1 applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one processor. The at least one computer memory may store instructions or programs which, when executed, cause the at least one processor operably coupled to the at least one memory to perform operations according to some embodiments or implementations of the present disclosure.

FIG. 18 illustrates another example of a wireless device applied to the present disclosure. The wireless device may be implemented in various forms according to a use-case/service (refer to FIG. 16).

Referring to FIG. 18, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the B Ss (200 of FIG. 16), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

FIG. 19 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 19, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

What is claimed is:

1. A method performed by a user equipment in a wireless communication system, the method comprising:
    receiving configuration information related to a 2-step Random Access Channel (RACH) procedure;
    transmitting a Message A (MsgA) to a base station as a part of the 2-step RACH procedure, the MsgA including a Physical Random Access Channel (PRACH) and a first Physical Uplink Shared Channel (PUSCH),
    wherein the PRACH is transmitted in a RACH occasion (RO), and the first PUSCH is transmitted in a PUSCH occasion (PO);
    based on that the first PUSCH is accompanied by a Small Data Transmission (SDT) transmission and that the SDT transmission is a part of SDT data, additionally transmitting the rest of the SDT data to the base station through one or more second PUSCHs in a state that there is no Radio Resource Control (RRC) connection to the base station, wherein each PUSCH of the first PUSCH and the one or more second PUSCHs includes information of time and frequency resource allocation of a next second PUSCH; and
    based on that the first PUSCH is not accompanied by the SDT transmission, performing a procedure for the RRC connection to the base station through the 2-step RACH procedure including reception of a Message B (MsgB) from the base station including a contention resolution message.

2. The method of claim 1, wherein each PUSCH of the first PUSCH and the one or more second PUSCHs includes information of a presence or non-presence, Transport Block Size (TBS), or Modulation and Coding Scheme (MCS) of the next second PUSCH.

3. The method of claim 1, wherein each of the second PUSCHs includes information of a resource of an associated PRACH or an associated MsgA transmission timing.

4. The method of claim 1, wherein based on receiving Acknowledgement (ACK) information on a specific second PUSCH from the base station during transmission of a plurality of the second PUSCHs, a retransmission procedure for previous second PUSCHs including the specific second PUSCH is terminated.

5. The method of claim 4, wherein the reception of the ACK information includes receiving a MsgB in response to the MsgA and wherein the specific second PUSCH comprises a second PUSCH transmitted last before the reception of the MsgB.

6. A user equipment used in a wireless communication system, the user equipment comprising:
    at least one transceiver;
    at least one processor; and
    at least one computer memory operably connected to the at least one processor and enabling the at least one processor to perform an operation when executed, the operation comprising:
    receiving configuration information related to a 2-step Random Access Channel (RACH) procedure;
    transmitting a Message A (MsgA) to a base station as a part of the 2-step RACH procedure, the MsgA including a Physical Random Access Channel (PRACH) and a first Physical Uplink Shared Channel (PUSCH),
    wherein the PRACH is transmitted in a RACH occasion (RO), and the first PUSCH is transmitted in a PUSCH occasion (PO);
    based on that the first PUSCH is accompanied by a Small Data Transmission (SDT) transmission and that the SDT transmission is a part of SDT data, additionally transmitting the rest of the SDT data to the base station through one or more second PUSCHs in a state that there is no Radio Resource Control (RRC) connection to the base station, wherein each PUSCH of the first PUSCH and the one or more second PUSCHs includes information of time and frequency resource allocation of a next second PUSCH; and
    based on that the first PUSCH is not accompanied by the SDT transmission, performing a procedure for the RRC connection to the base station through the 2-step RACH procedure including reception of a Message B (MsgB) from the base station including a contention resolution message.

7. The user equipment of claim 6, wherein each PUSCH of the first PUSCH and the one or more second PUSCHs includes information of a presence or non-presence, Transport Block Size (TBS), or Modulation and Coding Scheme (MCS) of the next second PUSCH.

8. The user equipment of claim 6, wherein each of the second PUSCHs includes information of a resource of an associated PRACH or information related to an associated MsgA transmission timing.

9. The user equipment of claim 6, wherein based on receiving Acknowledgement (ACK) information on a specific second PUSCH from the base station during transmission of a plurality of the second PUSCHs, a retransmission procedure for previous second PUSCHs including the specific second PUSCH is terminated.

10. The user equipment of claim 9, wherein the reception of the ACK information includes receiving a MsgB in response to the MsgA and wherein the specific second PUSCH comprises a second PUSCH transmitted last before the reception of the MsgB.

11. An apparatus for a user equipment, the apparatus comprising:
at least one processor; and
at least one computer memory operably connected to the at least one processor and enabling the at least one processor to perform an operation when executed, the operation comprising:
receiving configuration information related to a 2-step Random Access Channel (RACH) procedure;
transmitting a Message A (MsgA) to a base station as a part of the 2-step RACH procedure, the MsgA including a Physical Random Access Channel (PRACH) and a first Physical Uplink Shared Channel (PUSCH),
wherein the PRACH is transmitted in a RACH occasion (RO), and the first PUSCH is transmitted in a PUSCH occasion (PO);
based on that the first PUSCH is accompanied by a Small Data Transmission (SDT) transmission and that the SDT transmission is a part of SDT data, additionally transmitting the rest of the SDT data to the base station through one or more second PUSCHs in a state that there is no Radio Resource Control (RRC) connection to the base station, wherein each PUSCH of the first PUSCH and the one or more second PUSCHs includes information of time and frequency resource allocation of a next second PUSCH; and
based on that the first PUSCH is not accompanied by the SDT transmission, performing a procedure for the RRC connection to the base station through the 2-step RACH procedure including reception of a Message B (MsgB) from the base station including a contention resolution message.

12. The apparatus of claim 11, wherein each PUSCH of the first PUSCH and the one or more second PUSCHs includes information of a presence or non-presence, Transport Block Size (TBS), or Modulation and Coding Scheme (MCS) of the next second PUSCH.

13. The apparatus of claim 11, wherein each of the second PUSCHs includes information of a resource of an associated PRACH or an associated MsgA transmission timing.

14. The apparatus of claim 11, wherein based on receiving Acknowledgement (ACK) information on a specific second PUSCH from the base station during transmission of a plurality of the second PUSCHs, a retransmission procedure for previous second PUSCHs including the specific second PUSCH is terminated.

15. The apparatus of claim 14, wherein the reception of the ACK information includes receiving a MsgB in response to the MsgA and wherein the specific second PUSCH comprises a second PUSCH transmitted last before the reception of the MsgB.

* * * * *